3,384,282
PNEUMATIC CONVEYOR FOR STRIP
MATERIALS
Hilmar Vits, Langenfeld, Germany, assignor to Maschinenfabrik VITS G.m.b.H., Langenfeld, Rhineland, Germany, a corporation of Germany
Filed Aug. 23, 1965, Ser. No. 481,703
Claims priority, application Germany, Sept. 3, 1964,
M 62,302, M 62,303
11 Claims. (Cl. 226—97)

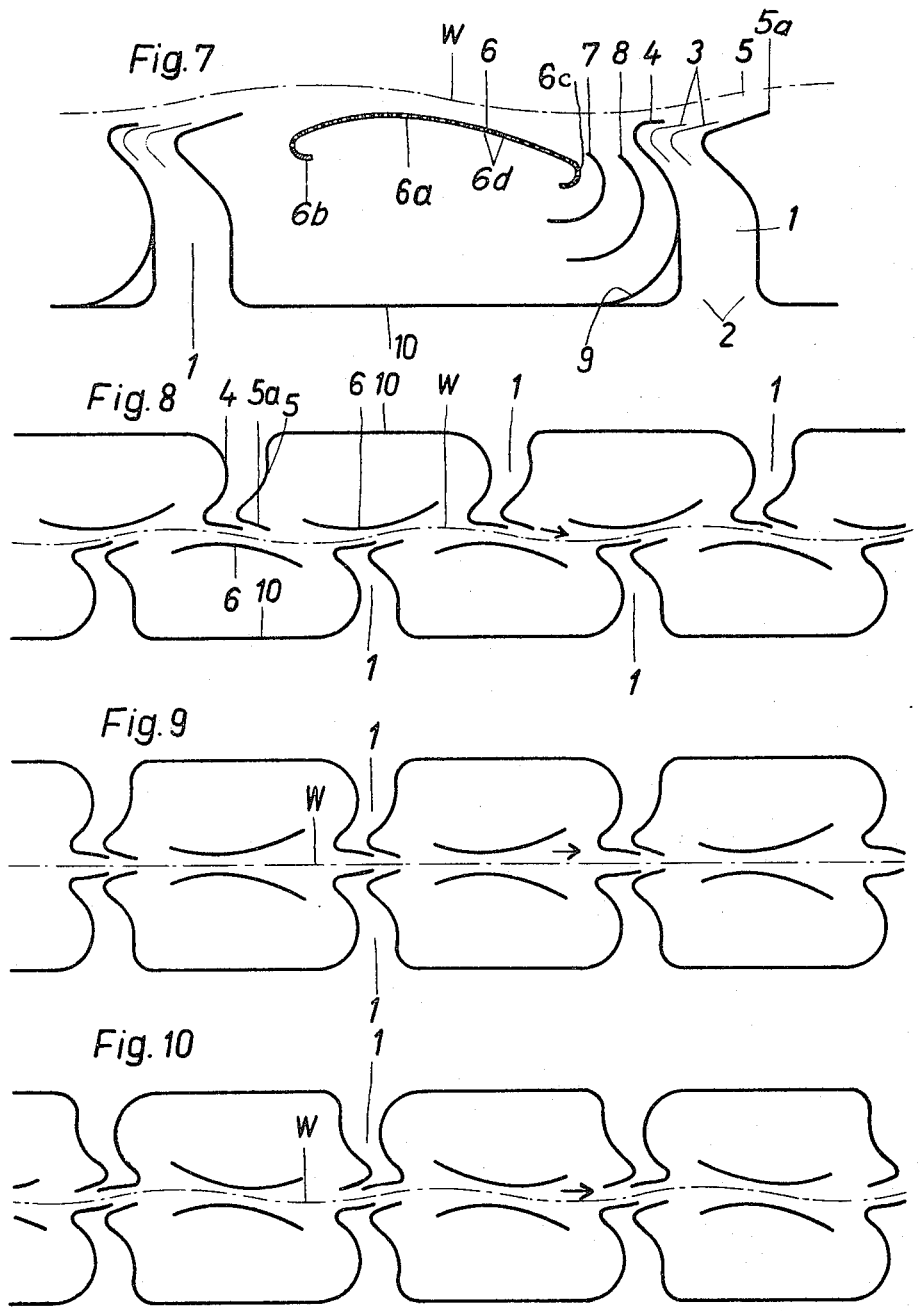

ABSTRACT OF THE DISCLOSURE

This is an apparatus for floating conveyance of strips of contact-sensitive materials. It is of the type having air nozzles disposed opposite one or both faces of a workpiece strip for directing an airstream that is flatly inclined in relation to the plane of the workpiece. Each nozzle has a downstream wall and an upstream wall, with an aperture in between, and the downstream nozzle wall extends a distance of at least twice the minimum width of the free nozzle aperture as measured in the longitudinal plane perpendicular to the workpiece. Between each succeeding pair of nozzles is a surface which is convex in relation to the workpiece, substantially filling the space between two successive nozzles, and having two edges, one edge facing against the direction of air flow lying outside the undisturbed air jet, the other edge facing in the direction of air flow and (together with the succeeding nozzle) forming an escape channel. The convex surface is preferably perforated. Each nozzle comprises a plurality of slits arranged in series, formed by flow-smoothing separating walls within the nozzle.

This invention relates to improvements in pneumatic conveyors for conveying long strips by floating them in an airstream. More particularly, the conveyor is of the type having air nozzles in the form of continuous slits or rows of perforations disposed transversely to the direction of travel opposite one or both surfaces of the conveyed article and blowing out air along a direction that is flatly inclined, in relation to the conveyed article.

Apparatus of this type are often used for simultaneous treatment by air and heat, for example in drying of materials which are sensitive to touch or are damaged by contact with solid articles. In modern technology, the properties of materials are often improved by the application of fluid coating substances to one or both sides of the material, and the coating remains sensitive to touch until the coating has dried completely, so that it is necessary to float the material while conveying it during the time that it is drying.

This type of conveying is used, for example in the manufacture of art paper, in which both sides of the paper web are coated simultaneously and then dried. It is also used in connection with the impregnation of paper for the insulated-plate industry and for the decorative synthetic plate industry, the drying of directly dyed or imprinted textile fabrics and woven fabrics, the coating of foils of various materials, including those of metal, and in the photographic, blueprint and other reproduction industries, as well as in the packaging and electric industries.

Also, in cases where only one side of the material is coated with a substance which is sensitive to touch or contact while the other side is supported on rollers, rods or similar supports, floating conveyance of the workpiece during the drying process is desirable, since otherwise, due to the high speed of advance and the shrinkage of the material during drying, difficulties may arise in the smooth advance and in the synchronized drives within the drier. Further, in the case of materials coated on one side only, it has often proved advantageous to cause air to act also on the uncoated side of the workpiece in order to thereby improve the drying effect on the coated side and thus to obtain better adherence of the coating substance.

For such floating conveyance of a workpiece, nozzles have been used to direct a uniform supporting jet of air onto the workpiece, at a more or less wide angle. Nevertheless, extraordinary difficulties have arisen in attempting to advance the workpiece smoothly, because the materials involved are easily bent; for example, paper, fabrics, and synthetic laminates hitherto could not be advanced floatingly with the desired uniformity because of the flow factors of the air jets used for their conveyance.

The hitherto employed nozzles blew against the workpiece more or less steeply to generate air cushions for supporting the workpiece. If the air current were to come from below only, it was, however, not possible to employ a very rapid air speed because the workpiece would move too far away from the nozzles, while the actual air speed acting on the workpiece would not increase very much. Yet, it is often desirable to have the greatest air speed possible act on the workpiece, in order to achieve the speediest possible drying effect.

For this reason, nozzles have also been provided above the floating workpiece, these upper nozzles generating air cushions which acted on the workpiece from above, so that the material was, as it were, interposed between two cushions. Nevertheless, this arrangement also failed to provide the desired stable advance, particularly where thin, easily bent materials were involved. On the contrary, it was found that the workpiece moved away from one nozzle while forming longitudinal creases, and moved near the opposite nozzle, even though the blast from both nozzles was identically strong. The reason for this bad behavior is that, if the air cushions do not move fast enough in the direction of conveyance, the workpiece moves in undulations, starting at the edges, under the action of air escaping to the sides and air flowing parallel to the workpiece. The concave side of such a wave offers considerably greater resistance to the air jet coming from the opposite nozzle than is the case on the convex side of the wave in relation to the air current on that side. As a result, despite air cushions that are identically strong and that move at identical speeds in the direction of conveyance, the workpiece sticks alternatingly to the upper and lower nozzles, being lifted from one and approaching the other nozzle when the shape of the undulations changes, due for example, to particularly strong flutter phenomena at the edge of the workpiece. When using the best air cushion nozzles, the workpiece does not actually come into contact with the nozzle, even in the case of materials of little rigidity, because the amplitudes of the undulations remain low, since in the immediate vicinity of the nozzle the air cushion has good supporting capacity; but the edges of the material often flutter so greatly that the workpiece edges come into contact with the adjacent structural parts of the drier. Thus, contact occurs with solid machine parts—an undesirable effect in view of the sensitivity of the material and resulting in a product of inferior quality, at least along the edges.

In an attempt to solve the problem, it was proposed to arrange the nozzles so that they blow against tubes or rollers and thus form a wheel-like or roller-like air cushion. However, the workpieces thus transported are often lifted far off the roller, "far" meaning that the clearance is greater than the width of the slit forming the nozzle.

Although, when blowing against rollers or tubes, it is possible for the workpiece to remain very close to the roller or the tube, an absolutely reliable floating advance cannot be achieved here either; so the rollers in such devices are rotatably supported and are often continuously driven in order to diminish friction in the event of contact of the workpiece with the roller. Still, even momentary contact of the not-yet-dry coating with the roller results in a faulty workpiece, and the purpose of the treatment is not achieved.

An object of the present invention is to arrange the nozzles in an apparatus of the type described above so that an absolutely reliable and smooth floating conveyance of the workpiece is achieved over any desired length of travel while simultaneously improving the drying effect. As a solution of this problem, the invention provides that the wall of the nozzle located forwardly with respect to the direction of airflow, is extended at least by twice the size of the free nozzle aperture measured in the longitudinal plane perpendicular to the plane of the workpiece, and terminates in an edge. It has been found that this extraordinarily simple measure achieves a surprising improvement of the floating conveyance of the workpiece, which now passes through the apparatus without flutter phenomena in absolutely fixed waves.

Preferably, each nozzle consists of a plurality of slits arranged in series. These slits may be formed by flow-smoothing separating walls within the nozzle. It is further of advantage to have the blowout angles enclosing the series of slits of a nozzle with the workpiece increase in direction of the main current, that is, to provide the slit lying forwardly in the direction of flow with a blowout angle which is more steeply inclined in relation to the workpiece than the preceding slit.

Another object of the present invention is to enable the use of greater air speeds than could hitherto be used, in order to improve the drying effect. The invention achieves this object by providing a surface which is convex in relation to the workpiece, disposed in back of each nozzle and substantially filling the space between two successive nozzles; the edge of this convex surface which faces against the direction of air flow is located outside the undisturbed air jet, and the edge facing in the direction of air flow cooperates with the succeeding nozzle to form an escape channel. This important structural change has the surprising effect that, by such simple means, a marked improvement in the floating conveyance of the workpiece is achieved, as a result, the workpiece performs substantially as if it were running over fixed supports.

Important further advantages may be obtained by perforating the convex surfaces. This perforation results in automatic compensation between the excess pressure and the vacuum on the said surface, so that the workpiece is maintained at a precise and constant distance from the nozzle arrangement.

Still further advantages may be obtained by shaping the convexly shaped surface so that it is similar to the back profile of an airplane wing.

The invention is described in greater detail hereinbelow in connection with the drawings, in which:

FIG. 7 is a view in vertical section through two nozzles arranged in series in accordance with the principles of the invention;

FIG. 8 is a simplified schematic view in vertical section through a system of this invention having nozzles which are offset in relation to each other and are disposed both beneath and above the workpiece;

FIG. 9 is a view similar to FIG. 8, with the nozzles arranged opposite each other on both sides of the workpiece and pointing in the same direction; and FIG. 10 is a view similar to FIG. 9 of a further embodiment of the nozzle arrangement of the invention, also in simplified vertical section, with the upper nozzles pointing the opposite direction from the lower nozzles.

For better understanding of the effect of arrangements in accordance with the invention, the buoying force of nozzles on workpieces in the schematic representations according to FIGS. 1–6 is shown as a function of the distance of the nozzle from the workpiece.

Figure 1:
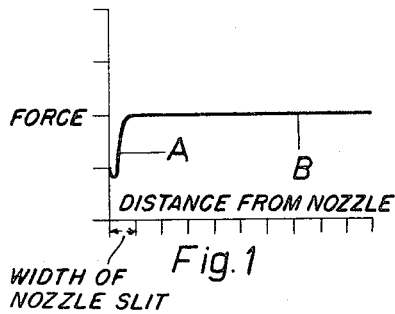
FIG. 1 is a schematic representation of the force exerted by a simple single nozzle directed vertically at a workpiece, as a function of the distance between the nozzle and the workpiece.

The curve plotted in FIG. 1 shows along the ordinate the force of a nozzle directed vertically against the plane of the workpiece. The distance of the workpiece from the nozzle orifice is plotted in direction of the abscissa. It is seen that the buoying force remains equally great at all distances from the workpiece, with the exception of distances very close to the nozzle, where the buoying force diminishes to one-half of its otherwise substantially constant value. The critical range wherein the buoying force decreases considerably lies within a distance of the workpiece from the nozzle orifice corresponding to about one-half the nozzle diameter or one-half the width of the nozzle slit. The divisions along the abscissa have been made equal to the width of the slit, that is, one abscissa unit corresponds substantially to the width of the nozzle slit. The starting portion A of the curve depends for its shape largely on the type of the nozzle and its orifice. The straight part B is substantially free from such influence.

Figure 2:
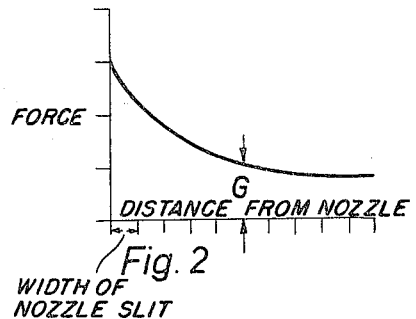
FIG. 2 is a schematic representation of the behavior of the buoying force of an air cushion nozzle comprising a plurality of individual nozzles.

FIG. 2 plots the effects of distance on buoying force in an air cushion nozzle arrangement in which there are empty spaces between a series of individual air jets. Starting from the nozzle orifices, the buoying force decreases as the distance widens. Workpieces of different weights are thereby kept at different distances from the nozzle, namely at a distance at which their weight is compensated by the air current. For example, a workpiece is indicated at G whose weight corresponds to the buoying force prevailing at this point of the curve.

The buoyant force behavior graphically illustrated in FIG. 2 is achieved by cooperation of a plurality of closely adjacent nozzles; air scoops are formed between the individual jets which, on the one hand, are screened by the nozzle surface and on the other by the workpiece, and laterally by air jet walls. When the workpiece is at a great distance from the nozzles, decrease of energy and consequent decrease of buoyant force occur due to friction of the individual air jets.

Figure 3:
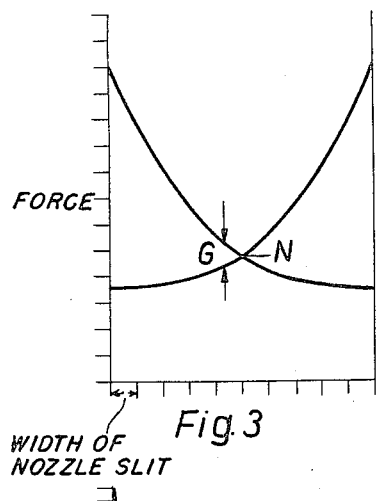
FIG. 3 is a schematic representation of the behavior of two nozzles disposed opposite each other.

FIG. 3 shows the buoyant force behavior of the two oppositely disposed nozzles. The two curves intersect in a neutral point N. The weight of the workpiece which in this arrangement can be maintained afloat is determined from the difference between the two curves at a specific point. In this type of arrangement, the air cushions are automatically pressed against each other. However, flutter phenomena occur on the edges due to the lateral escape of air, if the workpiece is not advanced in undulations. The lateral escape of air imposes narrow limits on an increase of air speed desirable in the interests of the quickest and most thorough drying effect. The higher the air speed and the tension of the workpiece, the greater are the undesired flutter phenomena along the edges of the workpiece.

A different course is followed with the nozzle arrangement in accordance with the invention. No use is made of compressed air cushions, and the workpiece is subject to the influence of air jets so that it does not move away from the nozzles even at the highest air speeds. In order to achieve this, the arrangement is such that pressure (buoying) and suction forces act on each side of the workpiece in such a manner that near the nozzle pressure forces prevail, and suction forces prevail away from the nozzle.

The compressive forces are generated, as will be seen particularly in FIGS. 7–10, by elongating that wall of the nozzle which is disposed forwardly, i.e. in the direction of air movement from the nozzle, by at least twice the width of the free nozzle orifice, measured in the longitudinal plane vertical to the plane of the workpiece, and by terminating this wall in an edge. The suction forces are obtained by providing a profiled supporting surface in back of the nozzle.

Figure 4:
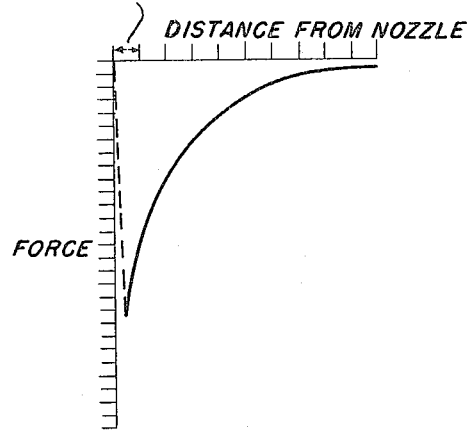
FIG. 4 is a schematic representation of the negative or suction force behavior of an airplane-wing type of camber.

Control of the negative buoying force needed for generating suction forces may be achieved by providing a nozzle portion which has a camber or airplane-wing type of cross section. The results produced by this type of camber are shown in FIG. 4. With such a suction-force producing surface, the suction forces become so great at the shortest distances from the nozzle to the workpiece that the workpiece tends to flutter. However, according to the present invention this undesirable phenomenon may be avoided by perforating the camber; this structural change produces the surprising result that the suction force then remains unchanged in relation to farther-removed workpieces, and it no longer materializes when the workpiece is very close. This appears to be due to the fact that, when the distance between the workpiece and the perforated surface is very short, the excess pressure increases in front of the narrowest gap between the workpiece and the camber, and that a part of the excess pressure is compensated by the perforation. On the other hand, when the distance of the workpiece from the apparatus is very slight, a greater excess pressure results in back of this narrowest gap, and under its effect air is sucked through the perforations and disturbs the marginal layer so that, when the distance is zero, the vacuum and its resultant suction force cannot develop.

Figure 5:
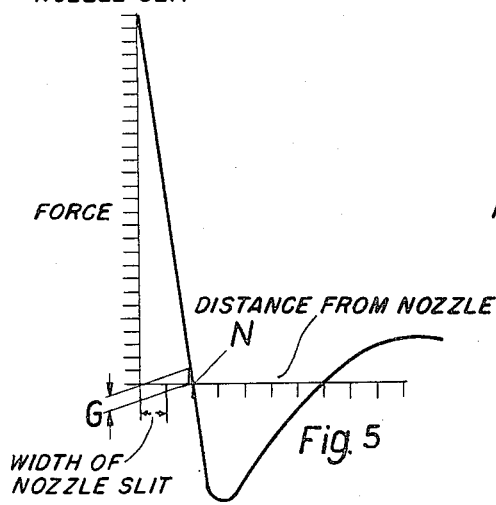
FIG. 5 is a schematic representation of the buoying or suction force behavior of a nozzle arrangement in accordance with the present invention.

FIG. 5 illustrates the buoying and suction force behavior of the arrangement in accordance with the invention, from which it can be seen that a great buoying force acts on the workpiece when its distance from the nozzle is short, the buoying force passing a first zero point at a distance corresponding substantially to twice the nozzle width, and continuing into the negative range. When the distance of the workpiece from the nozzle corresponds to about four times the width of a nozzle, the value of the suction force is highest, and from here on it decreases as the distance increases and again intersects the X-axis at an abscissa value of about 7. The workpiece is conveyed stably when it is at a distance from the nozzle obtained by the zero passage of the curve G–N in FIG. 5. With such an arrangement, it is immaterial whether the nozzles are disposed only on one side or on both sides of the workpiece. When nozzles are provided on both sides of the workpiece, their distance from each other preferably corresponds to twice the distance indicated by the zero passage in FIG. 5.

Figure 6:
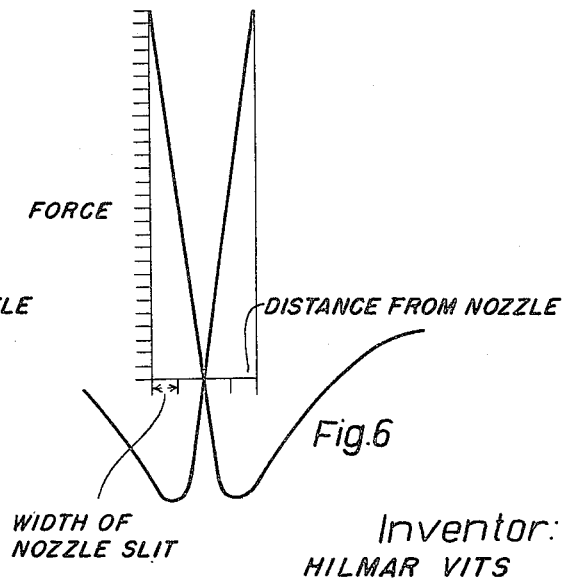
FIG. 6 is the buoying force behavior of a two-sided nozzle arrangement in accordance with FIG. 5, also in schematic representation.

The buoying force behavior as illustrated in FIG. 5 and also in FIG. 6 results from the fact that the suction force is preponderant in the part far removed from the nozzle, and the buoying force is preponderant in the part nearer the nozzle. In order to achieve as steep a trajectory of the characteristic curve as it appears in FIGS. 5 and 6, the wall of the nozzle blowing against the workpiece at a flat angle and facing the camber next in the direction of air flow is extended so that a wedge-like space is formed between the extension and the workpiece. The air jet from the nozzle can therefore continue blowing even when the workpiece is at zero distance from the nozzle edge. However, the direction of the air jet is now deflected by almost 180°.

The buoying force behavior is a function of the degree of deflection and the amount of deflected air. While almost no deflection of the air jet occurs when the workpiece is at the desired distance from the nozzle, the air jet is extraordinarily greatly deflected when the workpiece approaches the nozzle. The result is a correspondingly great increase of the buoying force, so that contact of the workpiece with the nozzle is avoided at all events and the workpiece itself is kept at a substantially constant distance from the nozzle arrangement.

FIG. 7 illustrates details of the nozzle arrangement in accordance with the invention, two nozzles being shown disposed in series in the direction of travel of the workpiece, both in vertical section. The nozzles 1 are supplied with air from a compressor (not shown) through a conduit 2. Baffles 3 divide the nozzle orifice into three partial nozzles located between the rear boundary wall 4, i.e. the wall which is the rear one in relation to the direction of movement of the workpiece W as indicated by arrows and the forward wall 5. The forward wall 5 is extended at 5a in the region of the orifice. The extension 5a is at least twice the size of the free nozzle aperture measured in the longitudinal plane perpendicular to the plane of the workpiece. The free nozzle aperture is here meant to be the length of the perpendicular line drawn on one of the baffles 3 in the region of the orifice up to the section with the adjacent wall portion.

Between two nozzles 1, a camber (or airplane-wing type of surface) 6 is provided, the highest point 6a of which is substantially at the same level as the terminal edge of the extension 5a. The edge of the camber 6 which the air current hits first is disposed in relation to the adjacent wall 5, 5a of the nozzle in such a manner that the jet leaving the nozzle does not touch the camber unless it is deflected by the workpiece W. The other edge 6b of the camber 6 which the air stream hits last is disposed at such a distance from the next nozzle that escape of air between the camber 6 and the nozzle 1 is not hindered. The wall 4 is preferably in the form of a baffle, so as to facilitate escape of air. Escape may be further improved by additional baffles 7, 8 and 9, so as to avoid changes in the motive power behavior by backwash between the nozzles, particularly where lightweight workpieces are involved. The perforations 6d result in the automatic compensation between the excess pressure and the vacuum on the surface 6, as discussed above, which help to maintain the workpiece W at a precise and constant distance from the nozzle arrangement.

The end of the camber 6 designated 6c and which the air jet reaches last, is at such a distance from the wall 4 that a space is left free which does not hinder escape of air. In order to aid the air escape, the nozzle wall 4 is in the form of a baffle plate. For further improvement, additional baffle plates 7, 8 and 9 may be provided. Particularly when used with lightweight workpieces, such baffle plates act to prevent deterioration of the buoying force behavior by backwash between the nozzles.

A partition 10 is disposed between successive intake ducts 2 of successive nozzles 1, whereby hollow spaces are created extending transversely to the workpiece W and formed by the camber 6, the partition 10, and walls 4 and 5 of the nozzle, and the baffle 9. These hollow spaces are so large that air leaving the nozzles may escape to the sides. The escaping air may be caught by ventilators (not shown), heated in heat exchangers and returned to the nozzles.

The nozzles may be arranged in different ways, and arrangement on one side of the workpiece may be different from that on the other side, depending on the problem to be solved.

FIG. 8 shows the most often used nozzle arrangement, wherein the nozzles on both sides of the workpiece are offset in relation to each other by half a section. This causes a relatively great undulation of the workpiece since the suction effects occurring on the cambers are reinforced by the pressure effects produced by the opposite nozzle. The arrangement illustrated in FIG. 8 has proved to be excellent for driers in the paper coating industry.

The arrangement of the nozzles generates longitudinal forces, that is stresses, in the workpiece. When the nozzles are disposed in the direction of movement of the workpiece, the longitudinal stresses are greater at the entrance into the drier than further toward the center. This is very desirable in many instances since, despite application of a wet substance, the core of the paper is still dry and firm when arriving in the drier of coating machines, and it must be subjected to relatively great stress in order to overcome the friction of the counter-revolving polishing rollers. On the other hand, farther toward the center of the drier, the paper is softened by penetration of moisture contained in the coating substance. However, at this point, the stress in the workpiece has already subsided so that the paper does not tear nearly so easily. The longitudinal stress prevailing in the workpiece may therefore be influenced to a great extent by appropriately aiming the air jets.

FIG. 9 shows a nozzle arrangement in which the nozzles face each other on both sides of the workpiece. This arrangement is suitable for drying textiles which have been treated with direct dyes, because here the zones of excess pressure and vacuum are located directly opposite each other. As a result, air currents do not penetrate the fabric. That is important because, due to the variable mesh size of textile fabrics and the consequent different speeds of penetration of such air currents, variable drying effects would be obtained and therefore differences in the pigment concentration which in turn would result in lower quality.

FIG. 10 shows an arrangement in which the nozzles though standing opposite each other, blow in opposite directions above and below the workpiece, so that the longitudinal stresses are substantially compensated. This arrangement is suitable for drying impregnated paper which at times must be dried with little stress.

The nozzle arrangements may be changed in the course of a long drying duct, should this be necessary. For example, in a drier for coated papers, operations may take place with the arrangement of FIG. 8 up to the center of the drier where, as experience has shown, the strength of the paper diminishes, while for the rest of the drying duct an arrangement as per FIG. 10 may be selected so that, if the paper is overdried, as is desirable in some cases for chemical reasons, no additional stresses occur.

There are also advantages for vertical drying ducts which hitherto were limited as to their height by the specific weight of the goods and the admissible stress, because now the weight of the suspended workpiece may be compensated by nozzles delivering upwardly directed air jets.

Arrangement of the nozzles on one side of the workpiece is not limited to their having to be disposed beneath the workpiece. They may as well lie on the upper surface of the workpiece, in which case the suction forces of the assembly act so strongly that the workpiece is suspended beneath the nozzles.

As compared with conventional air cushion arrangements, the nozzle arrangement in accordance with the invention has the advantage that a substantially larger part of the surface of the workpiece is impinged upon by the high-speed air, since the extension of one side wall of the nozzle takes care of an increased air speed. With otherwise identical drying conditions, therefore, the use of the nozzle arrangement in accordance with the invention results in an efficiency increase of about 50%.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for floating conveyance of strips of contact-sensitive materials, having a plurality of air nozzles disposed opposite at least one face of a workpiece strip for directing an airstream that is inclined at a flat angle in relation to the plane of the workpiece, said nozzles having a downstream wall and an upstream wall, with an aperture therebetween, characterized in that said downstream wall extends a distance of at least twice the minimum width of the free nozzle aperture, as measured in the longitudinal plane perpendicular to the plane of the workpiece, said downstream wall terminating in an edge, and, between each successive pair of nozzles on the same side of said workpiece, a surface which is convex in relation to the workpiece substantially fills the space between two successive nozzles, the said surface having a first edge facing against the direction of air flow and lying outside of the undisturbed air jet, and a second edge facing in the direction of air flow, said second edge together with the upstream wall of said succeeding nozzle, forming an escape channel.

2. Apparatus in accordance with claim 1, characterized by each nozzle comprising a plurality of slits arranged in series.

3. Apparatus in accordance with claim 2 characterized in that the slits are formed by flow-smoothing separating walls within the nozzle.

4. Apparatus in accordance with claim 1, characterized in that the size of the angles at which air is exhausted from the slits toward the workpiece increases in the direction of the main air current.

5. Apparatus in accordance with claim 1 wherein said convex surface is perforated.

6. Apparatus in accordance with claim 1 wherein said nozzles lie on both sides of said workpiece and are alternated so that there is a said convex surface opposite each said nozzle.

7. Apparatus in accordance with claim 1 wherein the upstream wall is shaped to provide a smooth curve leading around an arc and back toward the preceding nozzle, thereby facilitating escape of the air.

8. Apparatus in accordance with claim 7 having curved baffles between said second edge and said upstream wall, curved similarly to said upstream wall, to further facilitate escape of the air.

9. A pneumatic conveyor for strips of contact-sensitive materials comprising a series of nozzle means for directing an airstream that is flatly inclined in relation to the plane of the strips, each said nozzle means having a downstream wall and an upstream wall, with an aperture therebetween, said downstream nozzle wall extending at least twice the width of said aperture as measured in the longitudinal plane perpendicular to said strip, and between each succeeding pair of nozzle means and spaced therefrom, a camber that nearly fills the space between two successive nozzles.

10. The conveyor of claim 9 wherein said camber is perforated.

11. The conveyor of claim 9 wherein each nozzle means includes a series of slits separated by flow-smoothing separating walls within the nozzle means.

References Cited

UNITED STATES PATENTS

| | | | |
|---|---|---|---|
| 927,995 | 7/1909 | Morrow | 34—156 |
| 2,144,919 | 1/1939 | Gautreau | 34—156 X |
| 3,185,181 | 5/1965 | Demyan | 239—552 X |
| 3,232,507 | 1/1966 | Petersson | 226—97 |
| 3,287,821 | 11/1966 | Schregenberger | 34—156 |

M. HENSON WOOD, Jr., *Primary Examiner.*

R. A. SCHACHER, *Assistant Examiner.*